United States Patent [19]

Ojima et al.

[11] 4,371,360
[45] Feb. 1, 1983

[54] LOCKING MECHANISM IN TENSION PROVIDING DEVICE

[75] Inventors: Juji Ojima, Ebina; Koichi Yamamuro, Hatano, both of Japan

[73] Assignee: NHK Spring Co., Ltd., Yokohama, Japan

[21] Appl. No.: 195,763

[22] Filed: Oct. 10, 1980

[30] Foreign Application Priority Data

Oct. 12, 1980 [JP] Japan .................................. 54-131570

[51] Int. Cl.³ .......................... F16H 7/08; F01L 1/00
[52] U.S. Cl. .................................. 474/111; 474/140; 74/89.15
[58] Field of Search ............... 74/89.15; 411/110, 140; 474/111, 140

[56] References Cited

U.S. PATENT DOCUMENTS

| | | | |
|---|---|---|---|
| 522,287 | 7/1894 | Brown | 411/140 |
| 3,140,630 | 7/1964 | Wolf | 411/140 |
| 3,802,286 | 4/1974 | Winklhofer et al. | 474/111 |

FOREIGN PATENT DOCUMENTS

| | | | |
|---|---|---|---|
| 2270493 | 12/1975 | France | 474/111 |
| 45-22309 | 6/1970 | Japan | 474/111 |

*Primary Examiner*—Lawrence J. Staab
*Attorney, Agent, or Firm*—Fleit & Jacobson

[57] ABSTRACT

A locking mechanism for use in a tension providing device. The tension providing device has a first shaft with a threaded end portion disposed within the interior of a cylindrical casing and a second end with a slit groove formed therein. A second shaft of the tension providing device has a threaded end engaged with the threaded end of the first shaft and an end protruding from the casing for providing tension. Rotation of the first shaft by a spring results in translation of the second shaft with respect to the casing. The locking mechanism includes a stopper pin removably secured in a lid of the casing at a position spaced from the axis of the first shaft. The pin is movable into engagement with the slit groove to lock the first shaft.

2 Claims, 4 Drawing Figures

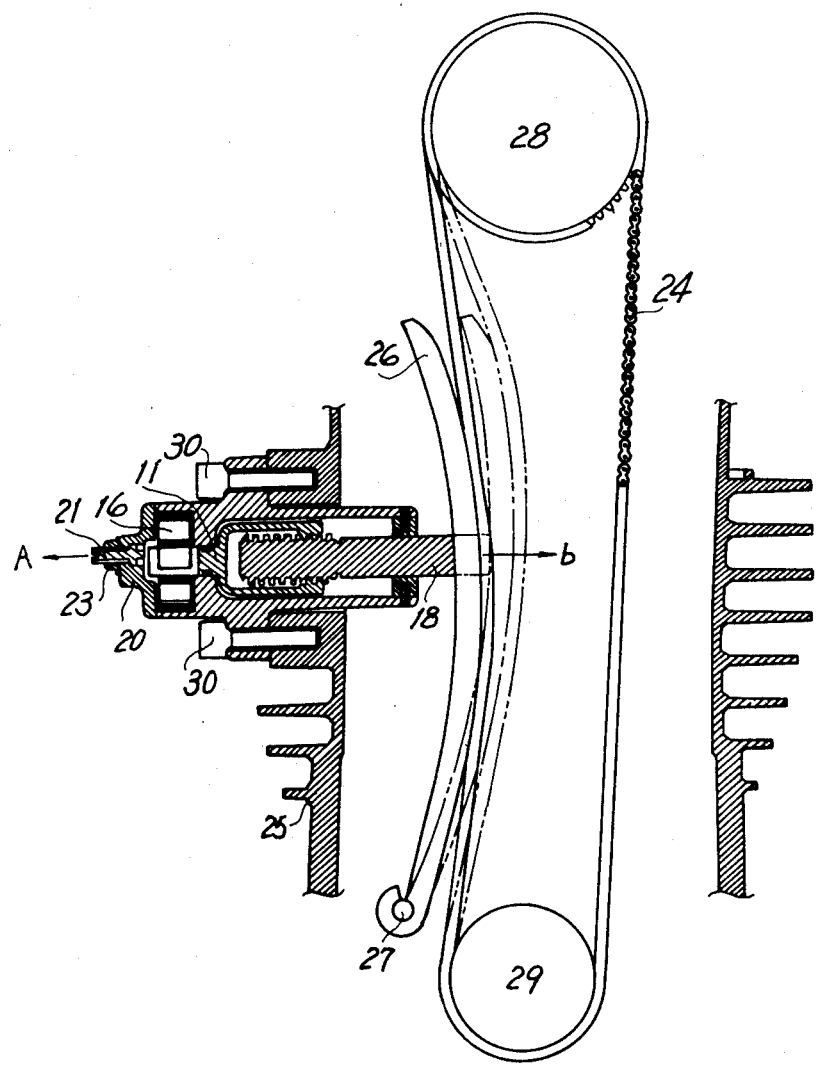

4,371,360

LOCKING MECHANISM IN TENSION PROVIDING DEVICE

BACKGROUND OF THE INVENTION

This invention relates to a tension providing device which enhances the stability of a spring.

Especially, this invention relates to a locking mechanism in a tension providing device which is simple in construction and is unnecessary for maintenance together with providing the maximum stability in the spring, thereby being allowed to lock or release the stability.

In general, "tension providing device" means a device always allowed to provide a pushing force in a fixed direction and possible to display a resistance force approximately the same as that of a rigid body when said device is subjected to a reaction force the counter-direction against said pushing force.

The above mentioned tension providing device, for instance, is used at a position where characteristics of the rigid body are requested when a reaction force in the counter-direction acts on a chain or a belt tensioner which is always pressed by a pushing force in a fixed direction. In other words, the chain tensioner gives a certain tension to a chain or a belt pressing it in the fixed direction when slackness occurs in said chain or said belt because of elongation or the wear and tear during the use. In this case, it is desirable that said device has characteristics nearly the same as that of the rigid body.

However, among said desirable tensioners, there exist such ones which are controlled by handling according to the elongation of the chain or the like or automatically. The former is a mechanical device and is comparatively cheap, but has such defects as difficulty in maintenance, generation of an abnormal sound because of being a perfect rigid body in the direction of the reaction force thereof and thereby increasing the wear and tear of the tension undurable to the use for a long period.

Further, the latter is a device which avails an oil pressure apparatus or the like and has such defects as the complication of a whole apparatus, the difficulty in treatment and a high price.

Heretofore, the tension providing device is provided with a mechanism having no necessity of maintenance as shown in FIG. 1. However, in this locking mechanism, the outer circumference of a piston 1 is pressed with a cap screw 7 and therefore the locking of the pushing force (in a direction shown with an arrow) is not sure and said cap screw 7 is apt to fall off. Furthermore, when this device is incorporated in an engine or other apparatuses, an oil leakage occurs from said cap screw portion or a wear and tear caused by a hair crack on a sliding surface which occurs by pressing the sliding portion of the piston 1 with said cap screw 7 directly. Still further, since the incorporation of the cap screw 7 in the device makes the control of the tensioner impossible, the exposure part of the device increases, thereby being impossible to make compact.

Further, since it is impossible to confirm the condition such as locking or unlocking of the pushing force in said device from outside, said device has such defects as taking much times in assembling, incorporating in an apparatus or control during the periodical inspection and is not used practically. Furthermore, in FIG. 1 the numeral 2 is a cylinder, 3 is a shoe integrated with the piston 1, 4 is a male screw, 5 is a spiral spring and the numeral 6 is a fixed pin.

SUMMARY OF THE INVENTION

This invention is designed in view of the above mentioned condition and provides a novel locking mechanism in tension providing device which is durable for the use of long period, easy in operation and is not necessary for maintenance with being able to maintain a proper pushing force in spite of a very simple structure.

BRIEF DESCRIPTION OF THE DRAWINGS

FIG. 4 is an explanation view which shows the use of the device in accordance with this invention.

DETAILED DESCRIPTION OF THE INVENTION

Figure 1:
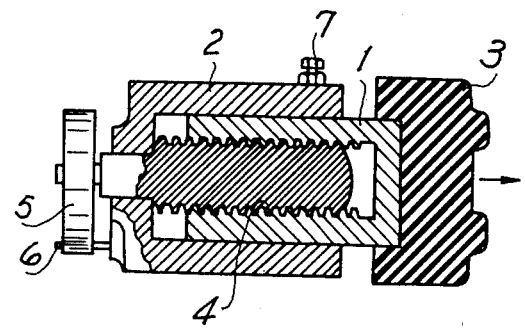
FIG. 1 is a vertical sectional view of the main portion shown in a conventional example.
Figure 2:
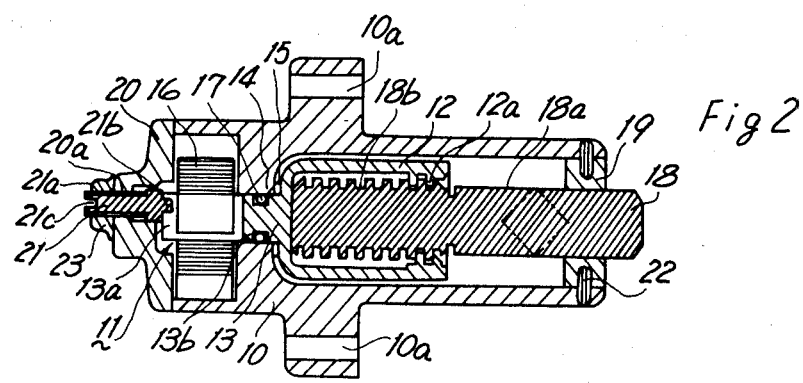
FIG. 2 is a vertical sectional view of an example of the device according to this invention.
Figure 3:
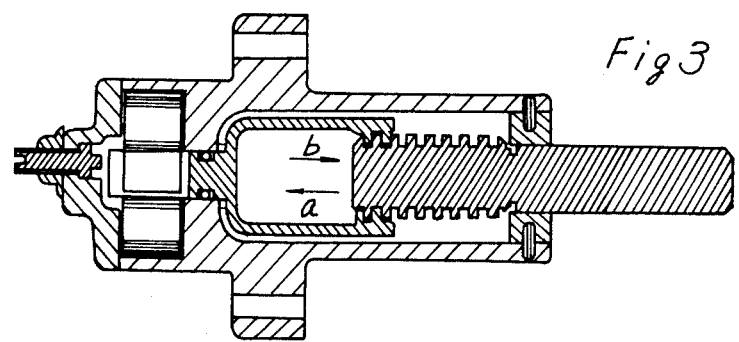
FIG. 3 is a vertical sectional view which shows the condition before setting this device.

Referring now to an example of the invention shown in FIG. 2 to FIG. 4, inclusive, the numeral 10 is a main body of a cylindrical case formed nearly H type, being provided with a flange for attaching to an apparatus, said flange being suitably fixed to an attached body with a screw or the like through a hole 10a of the flange.

The numeral 11 is a first shaft having a head portion 12 of nearly U type shape and an axial portion 13. At an inner circumference of an open end portion of said head portion 12 and at an end portion of the axial portion 13 are formed a female portion 12a and a slit groove 13a for fixing the spring respectively. Said axial portion 13 is secured rotatively to a bearing portion which projects inwardly from the inner wall of the cylindrical case body 10. A spacer 15 is located between the bottom of the head portion 12 and the bearing 14. Further, said axial portion 13 is restrained from sliding in the axial direction by a spring 16 which suitably fixes the outer end thereof to the cylindrical case 10 together with fixing and inserting the inner end of the axial portion 13 into the slit groove 13a formed at the end portion thereof.

In said axial portion 13, a ring groove 13b for fixing an O ring 17 is formed at a position that abuts against the bearing 14.

The numeral 18 is a second shaft having a sliding portion 18a formed with a sectional area of square shape that is inserted slidably into a perforated hole having a square shape of a bush 19 engaged with end surface of the cylindrical case 10. At the end portion other than the sliding portion 18a of the second shaft 18, the male portion 18b is formed and is screwed with the female portion 12a formed at the inner circumference of the head portion 12 of the first shaft 11. Further, in said example, the male screw is provided with the first shaft, and the female one with the second shaft respectively. But it is needless to say that the case of this inverse is also possible.

The side of the spiral spring 16 in said cylindrical case body 10 is covered with a lid 20, in which an eccentric screw hole 20a is formed within a range of a radius of the axial portion 13 from the center. The lid 20 is fixed to said cylindrical case body with a proper fixing means such as a bolt or the like.

A stopper pin 21 has a screw 21a screwed into the screw hole 20a of said lid 20 at the outer circumference thereof, a convex portion 21b engaged with the slit groove 13a of said axial portion 13 at the end side thereof, and a control split groove 21c or a control portion engageable with a driver or the like at another end projected from the lid 20. In other words, when the split groove 21c of the stopper pin 21 is rotated in a clamping direction with a driver or the like, the top convex portion 21b of said stopper pin 21 is engaged with the slit groove 13a of the first shaft 11 to latch it with a flange portion thereof. Further, when said split groove 21c is inversely returned in a released direction, the convex portion 21b slips out of the slit groove 13a of the axial portion 13 and the flange portion engages with the inside of said lid 20 to stop movement of the stopper pin. Since the center of said stopper pin 21 is eccentric from the center of the axial portion 13, it is possible to stop the rotation of the axial portion 13 in such a condition that the top convex portion 21b of the stopper pin latches with the slit groove 13a.

Further, the numeral 22 in FIG. 2 is a spring pin, whereby the cylindrical case body 10 is secured to the bush 19, and the numeral 23 is a nut to stop movement of the stopper pin 21.

In the above constitution, in order to store a pushing force in the axial portion, a forced rotation of the first shaft 11 must be performed in the winding direction of the spiral spring 16 by first removing the lid 20. The piston 18 slides towards a direction shown, in FIG. 3, by an arrow a according to this forced rotation. Subsequently, when the rotation of the spiral spring 16 in the unwinding direction is prevented with a suitable means, such as positioning the slit groove 13a of the axial portion 13 in this state and the stopper pin 21 is engaged with the slit groove 13a of the axial portion 13 after covering the lid 20, the pushing force is stored in the second shaft 18.

For instance, when said tension providing device is set in a fixed position as a chain tensioner as shown in FIG. 4 and the lock is released by relaxing the stopper pin 21 and drawing it out in the direction a, the first shaft 11 provides the pushing force in the fixed direction to the second shaft through the female screw portion 12a and the male screw portion 18b by the aid of the initial torque of the spiral spring 16 according to said forced rotation. Therefore, the pushing force in the fixed direction of the second shaft 18, for instance, acts in a direction to provide a given tension to a chain 24, and to maintain chain 24 or the like always in tension state having no slackness. Further, with the elongation and slackness of the chain, the second shaft 18 slides in the b direction by aid of the torque of the spiral spring 16, thereby maintaining the chain 24 in tension state having no slackness immediately. Further, in FIG. 4, the numeral 25 is a fixed wall, 26 is a shoe positioned so as to be supported at end end 27 and to abut to the chain 24 from outside, 28 and 29 are gears, and 30 is a bolt for fixing. Since the shoe 26 is made of raw material such as a hard rubber or the like, it may absorb the reaction force from the chain to some degree.

In said device, if a spring having a fixed torque is used in place of the spiral spring 16, the pushing force given to the second shaft 18 can be maintained always at constant.

As previously described in detail, the device according to this invention has a very simple construction availing the spring torque and can maintain a proper pushing force, thereby being capable of performing an easy working by operating a locking mechanism during assembly, incorporation to an apparatus, periodical inspection and the maintenance.

The locking mechanism of said tension providing device is possible to perform a secure locking and does not damage the sliding portion of the second shaft since the locking is performed with the combination of the slit groove and the convex portion of the stopper pin provided in the axial portion so as to operate from outside. Further, the lock or unlock operation can be not only operated repeatedly, but also the operating conditions can be confirmed from outside.

Furthermore, since this device has the locking mechanism portion at the outer end of the device, there occurs no hindrance in operation even in setting condition to an apparatus and is effective in securing compactly. Therefore, this device is sufficiently endurable to the use for a long period of time and is possible to provide a pushing force to the objective continuously since the spring torque is always acting. Accordingly, the maintenance such as the chain tensioner or the like becomes unnecessary and the effect is great.

What we claim is:

1. In a tension providing device wherein a first shaft is threadedly engaged with a second shaft and a rotation force of said first shaft is changed to a pushing force in an axial direction of the second shaft, a locking mechanism for preventing rotation of said first shaft which comprises:
    a slit groove formed at an axial end of said first shaft facing away from said second shaft;
    casing means encompassing said end of said first shaft facing away from said second shaft;
    lid means for covering a portion of said casing means including the axial end having a slit groove of said first shaft, said lid means having a threaded hole extending therethrough at a position eccentric from the axial center of said first shaft; and
    a stopper pin removably insertable into said slit groove at a position eccentric from the axial center of said end, said stopper pin having a control portion formed at one end, a projected portion for prevention of slipping out thereof which protrudes to the side formed at another end of said stopper pin, and a threaded portion extending between said control portion and said projected portion, said control portion being positioned outside of said casing, said threaded portion being engaged with said threaded hole of said lid, and said projected portion being inside of the casing, said another end of said stopper pin being engageable with said slit groove of the first shaft at the position eccentric from the axial center by operation of the control portion.

2. A tension providing device comprising:
    casing means defining an interior cavity;
    a bush closing an end of said cavity and having a non-circular opening formed therein;
    a first shaft having a threaded end portion disposed in said cavity and an axially extending portion, said axially extending portion being supported for rotation with respect to said casing means and having a slit groove formed at an end thereof;
    spring means for rotating said first shaft;
    lid means for covering a portion of said casing means containing said slit groove end, said lid means having a threaded hole formed therein alignable with a portion of said slit groove end spaced from the axis of said axially extending portion;

a stopper pin having a control split groove formed at one end, a projected portion protruding to the side of the pin formed at another end of said stopper pin, and a threaded portion extending between said control split groove and said projected portion, said threaded portion of said stopper pin being engaged removably with said threaded hole of said lid so that the control split groove is accessible from the outside of said casing and the projected portion is disposed in the inside of the casing for retaining the stopper pin in said casing, said another end of said stopper pin being engageable with the slit groove of the first shaft at a position eccentric from the axial center of said first shaft by rotation of the control split groove; and a second shaft having a threaded end portion engaged with the threaded end portion of said first shaft and a portion passing through said opening of said bush so that said bush prevents rotation of said second shaft whereby rotation of said first shaft by said spring means results in translation of said second shaft with respect to said casing means.

* * * * *